(12) United States Patent
Budde et al.

(10) Patent No.: US 6,957,382 B2
(45) Date of Patent: Oct. 18, 2005

(54) RECEIVING CIRCUIT FOR RECEIVING MESSAGES SIGNALS

(75) Inventors: Wolfgang Otto Budde, Aachen (DE); Peter Fuhrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 535 days.

(21) Appl. No.: 10/294,403

(22) Filed: Nov. 13, 2002

(65) Prior Publication Data

US 2003/0097625 A1   May 22, 2003

(30) Foreign Application Priority Data

Nov. 16, 2001 (DE) ................ 101 56 110

(51) Int. Cl.⁷ ........................................... H03M 13/00
(52) U.S. Cl. ........................ 714/820; 714/709
(58) Field of Search .................. 348/605; 370/536, 370/252; 345/98; 341/144; 714/820, 709

(56) References Cited

U.S. PATENT DOCUMENTS

| | | | |
|---|---|---|---|
| 5,761,209 A * | 6/1998 | Murakami | 370/536 |
| 6,429,844 B1 * | 8/2002 | Yoon | 345/98 |
| 6,433,720 B1 * | 8/2002 | Libove et al. | 341/144 |
| 6,480,471 B1 * | 11/2002 | VanZante et al. | 370/252 |
| 6,642,878 B2 * | 11/2003 | Libove et al. | 341/144 |

* cited by examiner

*Primary Examiner*—David Ton
(74) *Attorney, Agent, or Firm*—Adam Stroud

(57) ABSTRACT

The invention relates to a receiving circuit for receiving message signals, having a first sampler for converting the message signal into a first sampled signal by a first sampling method, having at least one second sampler connected in parallel with the first sampler for converting the message signal into a second sampled signal by a second sampling method, and having an analyzing unit for decoding the first sampled signal and/or the second sampled signal and checking them for errors.

10 Claims, 2 Drawing Sheets

RECEIVING CIRCUIT FOR RECEIVING MESSAGES SIGNALS

The invention relates to a receiving circuit for receiving message signals.

What is meant by a message signal is a signal that contains coded information.

Message signals that are transmitted over communications channels are subject to a wide range of error-generating influences. The errors that may occur are, in particular, amplitude and phase errors. Whereas amplitude errors typically cause single-bit or multi-bit errors, phase errors may damage, for example, invert, the entire contents of messages. Phase errors occur as a result of, for example, inaccuracies in bit synchronization between transmitter and receiver. A known method of avoiding phase errors is edge-based resynchronization, i.e. the bit timing of the receiver is adjusted to the data stream on receipt of each edge in the message or each bit. A method of this kind, where the length of a bit time is adjusted on the basis of an edge that is recognized, is known, for example, from the CAN Specification, version 1.2, Robert Bosch GmbH, 1990. However, when the input signals are badly affected by noise, this method may result in the bit synchronization unlocking completely and hence in the message content being lost.

It is an object of the invention to provide a receiving circuit and a method related thereto that make possible improved decoding of a received message signal.

For the receiving circuit, this object is achieved in accordance with the invention by a receiving circuit for receiving message signals, having a first sampler for converting the message signal into a first sampled signal by a first sampling method, having at least one second sampler connected in parallel with the first sampler for converting the message signal into a second sampled signal by a second sampling method, and having an analyzing unit for decoding the first sampled signal and/or the second sampled signal and checking them for errors.

In accordance with the invention, the receiving circuit has a circuit comprising a first sampler and a second sampler connected in parallel. A so-called sampler is a member that samples the message signal at definable points in time and converts it into a sampled signal comprising digital sampled values. The first sampler operates by a first sampling method and the second sampler by a second sampling method.

Hence the idea behind the invention is for an incoming message signal to be sampled in parallel by both a first sampling method and a second sampling method. As a result of this parallel sampling, the receiving circuit has available to it a first and a second sampled signal, which signals can be analyzed by an analyzing unit in a wide variety of different ways, either separately or in combination. If, for example, the first sampling method is ideal for the current conditions on the communications channel, the analyzing unit may select and process the first sampled signal. If conditions on the communications channel change at a later stage in such a way that sampling by the second sampling method gives better results, then the analyzing unit may select and further process the second sampled signal.

It is also possible for the first and second sampling methods to be identical and hence for the first and second samplers to operate by the same sampling method. Due to sampling inaccuracies, there is a higher probability that an unclear message signal can yet be correctly sampled by one of the samplers in this arrangement.

In the advantageous embodiment of the invention claimed in claim 2, the two samplers each have decoders connected downstream of them. As a result, the first and second sampled signals are decoded in parallel. Following this, the decoder output signal that has no errors or fewer errors can be selected and further processed.

In the advantageous embodiment of the invention claimed in claim 3, a control unit is provided that, as a function of the error signals from the first and/or second decoder, switches the output signal from the first decoder or the second decoder to a checking unit. The checking unit makes a check at message level, i.e. at the level of the bit stream reconstructed by decoder 1 or decoder 2. A possible way of making the check is, for example, cyclic redundancy checking (CRC). The first and second decoders are intended to make a check at code level, i.e. to monitor for injuries of all kinds to the code. The errors found by the checking unit are preferably also supplied to the control unit and used for controlling the switch.

The embodiment of the invention claimed in claim 4 has the advantage that only one decoder is required. While the sampled signal from the first sampling unit or the sampled signal from the second sampling unit is being analyzed by the analyzing unit, the sampled signal from the other sampler is buffer-stored in the memory. When required, i.e. if the analyzing unit detects errors in the first sampled signal analyzed, the sampled signal buffer-stored in the memory can be read out and analyzed. It is also possible in principle for the sampled signal buffer-stored in the memory to be analyzed for the purpose of improving the reliability with which a correct message is received.

In the advantageous embodiment of the invention claimed in claim 5, it is possible, using the switching means, to correct the samplers, memory, and decoder such that the first sampler or the second sampler is coupled directly to the decoder, whereas the respective other sampler is coupled to the memory. The decoder first decodes the signal from that sampler that is coupled directly to it and, if errors occur or are detected, can, in a second step, read out and decode the signal that was buffer-stored in the memory by the other sampler.

In the advantageous embodiment of the invention claimed in claim 6, sampling takes place in the first sampler in a fixed sampling pattern, i.e. the message signal received is sampled at fixed cyclic intervals and converted into a digital sampled signal. In the second sampler, sampling takes place with bitwise resynchronization, i.e. the bit timing of the receiver is adjusted to the received data stream on receipt of each edge in the message or each bit. The method of bitwise resynchronization is particularly suitable for avoiding phase errors. Phase errors occur as a result of, for example, inaccuracies in bit synchronization between transmitter and receiver. Phase errors may damage, i.e. invert, the entire contents of messages. The disadvantage of bitwise resynchronization is, however, that when the input signals are badly affected by noise, this method may result in the bit synchronization unlocking completely and hence in the message content being lost. If this happens, for example, the sampled signal from a further sampler, which operates with a fixed sampling pattern, for example, is available in the receiving circuit according to the invention, and the message signal received can still be analyzed and decoded without errors.

The samplers may be implemented in the form of analog-to-digital converters or threshold discriminators. When they are implemented as threshold discriminators, provision is preferably made for n-times oversampling. If, at a sampling time, the value of the message signal received is above a definable threshold value, the threshold discriminator emits a 1 as the sampled signal, and if not it emits a 0.

Where implementation is by means of an analog-to-digital converter, it is possible for a higher degree of quality analysis to be performed. Hence, with signal edges of shallow gradient, for example, it is possible to estimate the edge position from the waveform of the signal. To prevent any aliasing, the analog-to-digital converter should, however, have a band-limiting filter connected upstream of it.

The invention has particular advantages with edge-coded signals, such as signals that are coded by the Xerxes code, for example. In edge-coded signals, the information is conveyed solely by the occurrence of an edge in the signal, whereas the amplitude of an edge-coded signal is irrelevant.

In principle, this invention can be used in all areas of application in the fields of communications and storage technology. In particular, applications where safety is critical in automobile engineering, industrial automation, medical technology, etc. will benefit from the redundant sampling in respect of the cost that has to be paid for the envisaged safety level.

With respect to the method, the object of the invention is achieved by a method having the features detailed in claim 10.

These and other aspects of the invention are apparent from and will be elucidated with reference to the embodiments described hereinafter.

Figure 1:
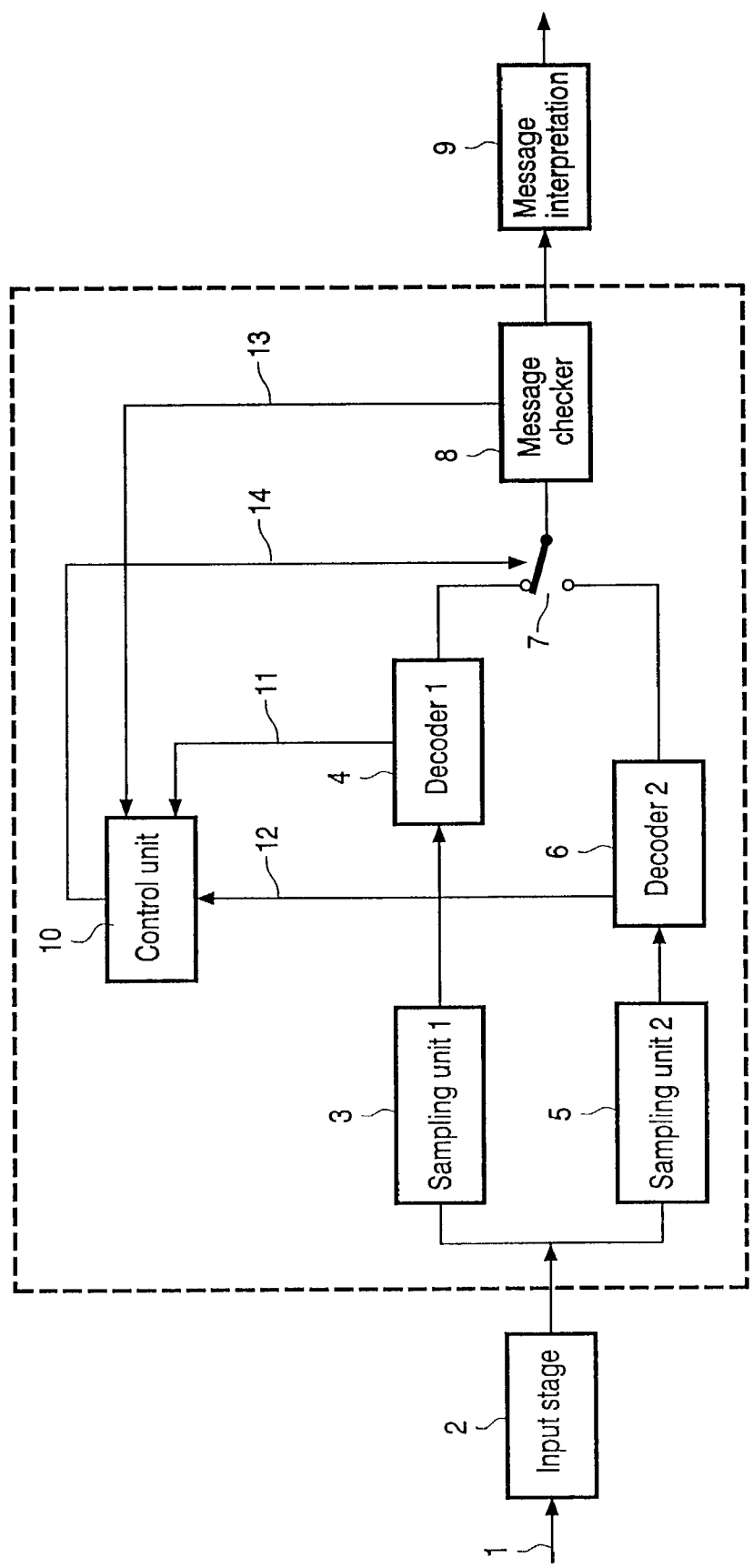
FIG. 1 is a block circuit diagram of a receiving circuit having two samplers and two decoders connected upstream thereof.

FIG. 1 shows a receiving circuit having an input stage 2 to which a message signal 1 is fed. The input stage 2 may comprise, for example, an HF and an IF mixer, filters, and other elements. The purpose of the input stage 2 is to perform an analog pre-processing of the incoming message signal 1. Connected downstream of the input stage 2 is a parallel circuit that has, in a first branch, a first sampler 3 having a first decoder 4 connected downstream of it and, in a second branch, a second sampler 5 having a second decoder 6 connected downstream of it. Connected downstream of this parallel circuit is a switch 7 by means of which the first or second branch of the parallel circuit can be connected to a checking unit 8. Connected downstream of the checking unit 8 is a message interpretation unit 9. Also provided is a control unit 10. The first decoder 4 supplies an error signal 11, the second decoder 6 supplies an error signal 12, and the checking unit 8 supplies an error signal 13 to the control unit 10. The control unit 10 controls the switch 7 and supplies a control signal 14 to switch 7.

The first sampler 3 and the second sampler 5 may be implemented in the form of threshold discriminators employing n-times oversampling. The sampler then samples the message signal at definable points in time. If at these sampling times the level of the message signal is above the threshold value, the sampler emits a 1, and if not a 0. Alternatively, the first sampler 3 and the second sampler 5 may be implemented in the form of analog-to-digital converters. This makes a higher degree of quality analysis possible. However, the analog-to-digital converter should have a bandpass filter connected upstream of it to prevent aliasing.

The first decoder 4 decodes the sampled signal from sampler 3, and the second decoder 6 decodes the sampled signal from sampler 5. At the same time, the first decoder 4 and the second decoder 6 perform a monitoring operation at code level for injuries of any kind to the code. If there are any injuries of this kind to the code, error signals 11 and 12 to this effect are supplied to the control unit 10. The checking unit 8 makes a check at message level, i.e. at the level of the reconstructed bit stream. This can be done by making a cyclic redundancy check (CRC), for example. The message interpretation unit 9 then performs further processing of the message or data. If errors are detected at message level, the checking unit 8 supplies the error signal 13 to the control unit 10.

In the receiving circuit shown in FIG. 1, the incoming message signal is thus processed in parallel by the first sampler 3 and first decoder 4, and by the second sampler 5 and second decoder 6. Sampling in a fixed sampling pattern, for example, may be performed in the first sampler 3 and sampling with bitwise or edgewise resynchronization in the second sampler 5. The control unit 10 can then decide, as a function of the error signals 11, 12 and 13 supplied to it, which method of sampling is particularly suitable for the message signal currently being received. This particularly suitable signal is selected and fed to the checking unit 8 through operation of the switch 7.

Figure 2:
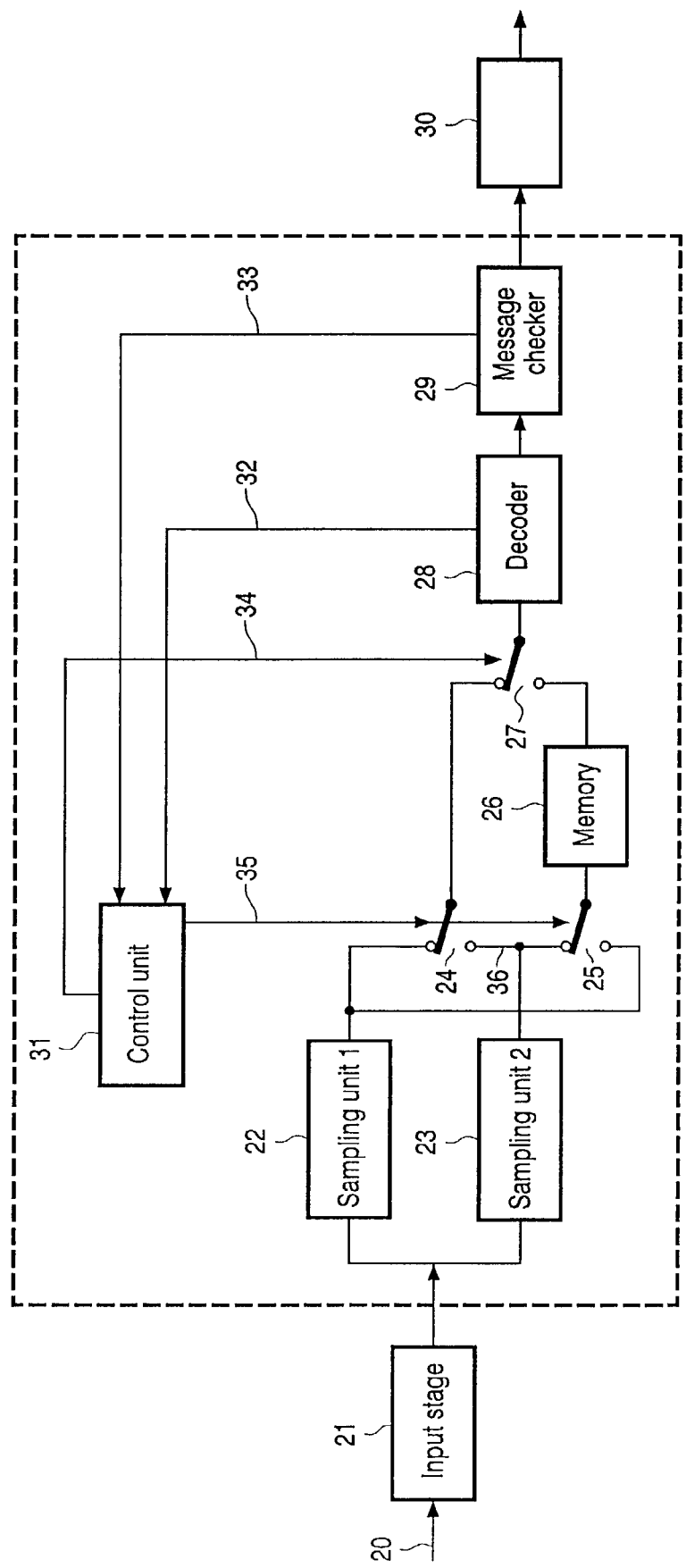
FIG. 2 is a block circuit diagram of a receiving circuit having two samplers, a memory for buffer-storing the sampled signal from a sampler, and one decoder.

FIG. 2 shows an alternative receiving circuit. This alternative receiving circuit has an input stage 21 to which a message signal 20 is fed. Input stage 21 corresponds to input stage 2 in FIG. 1. Connected upstream of the input stage 21 is a parallel circuit comprising a first sampler 22 and a second sampler 23. Samplers 22 and 23 correspond to samplers 3 and 5 in FIG. 1. Connected upstream of the first sampler 22 and the second sampler 23 are a first switch 24 and a second switch 25. On the one hand, the output signal from the first sampler 22 can be fed to a third switch 27 via the first switch 24. On the other hand, the output signal from the second sampler 23 can be fed to the third switch 27 via the first switch 24. The second switch 25 can feed the output signal from the second sampler 23 to a memory 26, or alternatively feed the output signal from the first sampler 22 to the memory 26. Connected downstream of the third switch 27 is a decoder 28. By means of the switch 27, the input of decoder 28 may either be connected to switch 24 or to the output of memory 26. Decoder 28 corresponds to decoders 4 and 6 in FIG. 1. Connected downstream of decoder 28 is a checking unit 29. This checking unit 29 corresponds to checking unit 8 in FIG. 1. Connected downstream of the checking unit 29 is a message interpretation unit 30. The decoder 28 supplies an error signal 32 to a control unit 31. The checking unit 29 supplies an error signal 33 to the control unit 31. The control unit 31 is provided for operating the first switch 24, the second switch 25, and the third switch 27. For this purpose it supplies a control signal 35 to the first switch 24, a control signal 36 to the second switch 25, and a control signal 34 to the third switch 27. In contrast to the receiving circuit shown in FIG. 1, the sampled signals supplied by the two samplers are not analyzed or decoded in parallel in the receiving circuit shown in FIG. 2, but provision is made for a sequential analysis. The sampled signal from the first sampler 22, for example, is first fed to the decoder 28, while at the same time the sampled signal from the second sampler 23 is buffer-stored in the memory 26. If the decoder 28 and/or the checking unit 29 have found errors in the signal supplied by the first sampler 22, they supply the error signals 32 and/or 33 to the control unit 31, as a result of which the third switch 27 is changed over and the signal from the second sampler 23, which was buffer-stored in the memory 26, is fed to the decoder 28. The decoder 28 and the message checker 29 are now able to analyze and decode the input signal 20 that was sampled by the sampling method implemented in the second sampling unit 23.

What is claimed is:

1. A receiving circuit for receiving message signals, having a first sampler for converting the message signal into a first sampled signal by a first sampling method, having at least one second sampler connected in parallel to the first sampler for converting the message signal into a second sampled signal by a second sampling method, and having an analyzing unit for decoding the first sampled signal and/or the second sampled signal and checking them for errors.

2. A receiving circuit as claimed in claim 1, characterized in that the first sampler has a first decoder connected downstream of it, and the second sampler has a second decoder connected downstream of it, and in that the analyzing unit selects the output signal from the first decoder or the second decoder for further message processing as a function of error messages from the first and second decoders.

3. A receiving circuit as claimed in claim 1, characterized in that the analyzing unit has a control unit, a switch, and a checking unit, in that error messages from the first and second decoders are fed to the control unit, in that the output signal from the first or second decoder can be fed to the checking unit by means of the switch, and in that the control unit operates the switch as a function of the error messages from the first and second decoders.

4. A receiving circuit as claimed in claim 1, characterized in that a memory is provided by means of which the sampled signal from either the first or the second sampler can be buffer-stored, in that the analyzing unit is designed for analyzing the sampled signal from one sampler in a first step and, if one or more errors is detected, to analyze the sampled signal from the other sampler, which was buffer-stored in the memory, in a second step.

5. A receiving circuit as claimed in claim 4, characterized in that the analyzing unit has a control unit, a decoder, and a checking unit, in that error messages from the decoder and the checking unit are fed to the control unit, in that switching means are associated with the control unit, by which switching means the sampled signal from either the first or the second sampler can be fed directly to the decoder, or alternatively the sampled signal from the respective other sampler, which was buffer-stored in the memory, can be fed to the decoder.

6. A receiving circuit as claimed in claim 1, characterized in that provision is made in the first sampler for sampling in a fixed sampling pattern as a first sampling method, and provision is made in the second sampler for sampling with bitwise resynchronization as a second sampling method.

7. A receiving circuit as claimed in claim 1, characterized in that the coded message signal is an edge-coded signal.

8. A receiving circuit as claimed in claim 1, characterized in that the sampler is implemented in the form of an analog-to-digital converter.

9. A receiving circuit as claimed in claim 1, characterized in that the sampler is implemented in the form of a threshold discriminator.

10. A method of receiving coded message signals, wherein the message signal is converted into a first sampled signal by means of a first sampling method, wherein the message signal is converted into a second sampled signal by means of a second sampling method in parallel with the first sampling method, and wherein the first sampled signal and/or the second sampled signal are analyzed as desired.

* * * * *